(12) United States Patent
Potanin et al.

(10) Patent No.: US 6,379,841 B1
(45) Date of Patent: Apr. 30, 2002

(54) SOLID STATE ELECTROCHEMICAL CURRENT SOURCE

(75) Inventors: Alexander Arkadyevich Potanin; Nikolai Ivanovich Vedeneev, both of Sarov (RU)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/487,630

(22) Filed: Jan. 20, 2000

(30) Foreign Application Priority Data

Jul. 23, 1997 (RU) ............................................. 97112603

(51) Int. Cl.$^7$ ................................................. H01M 4/58
(52) U.S. Cl. ................................ 429/218.1; 429/231.1; 429/219; 429/220; 429/224; 429/228
(58) Field of Search ............................... 429/218.1, 219, 429/220, 224, 225, 228, 231.5, 199, 304, 231.1

(56) References Cited

U.S. PATENT DOCUMENTS

| | | | | | |
|---|---|---|---|---|---|
| 4,216,279 | A | * | 8/1980 | Mellors | ....................... 429/191 |
| 4,218,527 | A | * | 8/1980 | Mellors | ....................... 429/191 |
| 4,327,166 | A | * | 4/1982 | Leger | .......................... 429/194 |
| 6,180,284 | B1 | * | 1/2001 | Shah et al. | ............... 429/218.1 |

FOREIGN PATENT DOCUMENTS

EP 55135 * 6/1982 ............ H01M/6/18

* cited by examiner

Primary Examiner—Stephen Kalafut
Assistant Examiner—R. Alejandro
(74) Attorney, Agent, or Firm—Randall W. Chang; William C. Daubenspeck; Virginia B. Caress

(57) ABSTRACT

A cathode and a solid state electrochemical cell comprising said cathode, a solid anode and solid fluoride ion conducting electrolyte. The cathode comprises a metal oxide and a compound fluoride containing at least two metals with different valences. Representative compound fluorides include solid solutions of bismuth fluoride and potassium fluoride; and lead fluoride and potassium fluoride. Representative metal oxides include copper oxide, lead oxide, manganese oxide, vanadium oxide and silver oxide.

10 Claims, 1 Drawing Sheet

SOLID STATE ELECTROCHEMICAL CURRENT SOURCE

Figure 1:
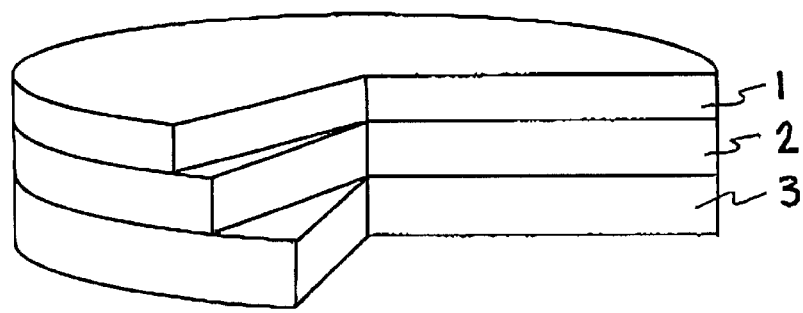

The invention relates to the electric engineering area, i.e. in particular to a solid state electrochemical current sources, in which the anode, the electrolyte, and the cathode are present in the solid phase condition.

The source of the invention may find the following applications:

In primary built-in batteries used in systems of a continues operation, and with a long service life at a normal temperature;

In primary autonomous batteries to be used at high temperatures;

In back-up batteries to be used by rescue teams, if heated. Such batteries may have a different power output, and operation duration, while these may be used in order to start diesed engines.

Definitions simple fluorides single metal fluoride compounds selected from the group consisting of $CoF_3$, $PbF_3$, $MnF_3$, $TaF_5$, $NdF_{351}$, $HgF_2$, $CuF_2$, $AgF$, $AgF_2$, $BiF_3$.

composite fluorides fluoride compounds that contain at least two metals with different valences compound fluorides fluoride compounds that contain at least two metals with different valences In the world, the following solid state electrochemical batteries are known which are disclosed in U.S. Pat. No. 4,216,279 published on Aug. 5, 1980 and in U.S. Pat. No. 4,215,827 published on Aug. 19, 1980, HOIM 6/18), where the anode is made of lead or its alloys; the electrolytes are made of composite fluorides based on $PbF_2$ with such additives as $SrF_2$, $BaF_2$, or $CaF_2$, and the KF admixture; as well as the electrolyte made of $PbF_2$—$SnF_2$, or $PbF_2$—$SnF_2$—$KF$; while the cathode is made of simple fluorides chosen from the following group: $CoF_3$, $PbF_3$, $MnF_3$, $TaF_5$, $NdF_5$, $HgF_2$, $CuF_2$, $AgF$, $AgF_2$, $BiF_3$ in the mixture with the manganese oxide (U.S. Pat. No. 4,216,279, HOIM 6/18) in the mole ratio of $MnO_2$/metal fluoride as 1:2.5, and about 3:1. The above mentioned manganese oxide has the content of water from 1 to 25% of mass. U.S. Pat. No. 4,218,527, HOIM 6/18 discloses as well the cathode, which is the mixture of one of the above mentioned simple fluoride, and the lead oxide in the m/o ratio of $PbO_2$, (metal fluoride as 3:1, and 1:3). The content of water in the aforementioned lead oxide is from 0.4% till 10% of mass.

These well-known batteries including the cathode, which is made of the mixture of α-non-composite metal fluoride with the manganese or lead oxide with a certain water content, have a limited operational temperature range as regards the battery discharge behavior, due to the presence of water in the cathode mixture, while this may be the reason of an unstable battery behavior.

The drawback of the aforementioned well-known batteries is their low energy capacity, which is associated with a low energy capacity of the interaction between the fluoride and lead in the anode. Theoretically, the energy capacity of the interaction between the fluoride and lead in the anode is 259 A·h/kg (of the anode weight), or 27.65 A·h/cm³ (of the anode weight). Besides, these batteries have a low open circuit voltage, i.e. the OCV is 1.36–1.94 V according to the testing results disclosed in U.S. Pat. No. 4,216,279, and OCV is 1.85–1.95 according to the testing results disclosed in U.S. Pat. No. 4,218,527.

The battery, which is the most close to the current source of the invention, is that disclosed in the European Patent EP 0055135 B1, HOIM 6/18. This battery comprises the anode, which is made of a metal chosen from the group of Li, Sr, Ba, Ca, Mg, Ce, La, alloys of Ce, La, Mg; the solid electrolyte, which is basically the composition of 70 m/o of the cerium or lanthanum fluoride, at least one fluoride, chloride, or carbonate of an alkaline earth metal and one fluoride, chloride or carbonate of an alkaline metal; and the cathode, which is made of the ion conducting composite fluorides including two metals with different valency, in particular, the ion conducting composite salts such as $KBiF_4$, $TlBiF_4$, $RbBiF_4$.

The disadvantage of such technical decision is a low OCV. E.g. the battery including the anode made of Ce, or La; the $CeF_3$—$SrF_2$—$LiF$ electrolyte, and the $PbSnF_4$—based cathode has the OCV of 2.28 V. The use of the anode made of a pure lanthanum, and of the cathode made of pure $PbF_2$ did not change the OCV magnitude.

The low OCV of the aforementioned well-known batteries causes the decrease of their power output behavior, which in its turn imposes a certain limitations on the number of practical applications of the batteries.

Besides, one of the essential drawbacks of the above mentioned battery type is its limited operational temperature range in a solid phase condition. The metals which are being reduced during the discharge in the cathode composition have as a rule, a low melting point (e.g. Rb, Bi, Tl). That is way the temperature range of the solid phase reactions is limited by this point. So, such batteries have a low fire resistance, as well as a low stability with regard to other accident effects, due to the limited stability of the solid phase of the battery components.

The task, which is addressed in the present invention, is the enhancement of technical and operational parameters of the solid state current source, i.e. the upgrading of its OCV; of its power output behavior during the discharge; and widening of its operational temperature range in the solid phase condition.

The technical results, which may be reached provided the use of the present invention, are the following:

The OCV is enhanced from 2.74V (of the prototype) till 3.9V.

The power output number is increased by factor of two in relation to the prototype;

The source's operational temperature range in the solid phase condition is increased from 271° C. (of the prototype) till 500° C.

In order to accomplish the aforementioned task of the invention, into a well-known battery including the anode, the ion conducting electrolyte, and the cathode, which is an ion conducting composite fluoride formed by at least two metals with different valences, it was introduced a metal oxide into the cathode composition, provided the following mole percentage of the components are observed:

a composite fluoride: 11.5–96.9 m/o;

a metal oxide: 3.1–88.5 m/o.

The invention relates to the current source, in the cathode of which it is used copper oxide (CuO), lead oxide ($PbO_2$), manganese oxide ($MnO_2$), vanadium oxide ($V_2O_5$), or silver oxide ($Ag_2O$).The composite fluoride of the cathode is the solid solution of vithmuth fluoride and potassium fluoride, or the solid solution of lead fluoride with potassium fluoride. The anode of the source is either made of a metal from the group of rare earth metals, or of an alloy of such a metal. The electrolyte is a solid fluoride ion conductor including at least one fluoride of a rare earth metal, and at least one fluoride of an alkaline earth metal.

The invention relates to the solid state current source, in which the current producing reaction is possible due to the fluoride ions transport from the cathode, and due to the interaction of these ions with the anode material. The viability of the ion transport is determined by the electric driving force (EDF) of the source, which practically corresponds to the measured numbers of the source's open circuit voltage (OCV). The character of the current producing reaction depends on the fluoride ion conductivity of the electrolyte material, on that of the composite fluoride comprised in the cathode, and on that of the fluoride, which is formed as a result of the interaction of the anode material with fluoride ions.

It was experimentally proved that:
1. The OCV of the solid state current source considerably increases, if the cathode contains the mixture of the ion conducting composite fluoride and the oxide;
2. The use of the mixture of the ion conducting composite fluoride and the metal oxide as the cathode in the aforementioned batteries leads to their discharge voltage increase. This finally defines the enhancement of the specific power of the discharge of the current sources.

In distinction from other well known batteries of similar type (i.e. disclosed in the U.S. Pat. Nos. 4,216,279 and 4,218,527), in which the mixture of a simple fluoride with $PbO_2$, or $MnO_2$, is used as the cathode, along with a certain water content in the aforementioned oxide, the latter condition is not obligatory as regards the current source of the present invention. In the cathode of the source of the present invention, which contains the ion conducting composite fluoride and metal oxides, the fluoride ion conductivity preserves in the solid phase condition of the source, and this source in a stable way discharges without a water content in the oxide of the cathode. The aforementioned oxide reacts with the metal, or metals of the composite fluorides of the cathode which leads to the increase of the EDF, and power output behavior upgrading.

In FIG. 1 it is shown a schematic of the current source of the present invention.

Figure 2:
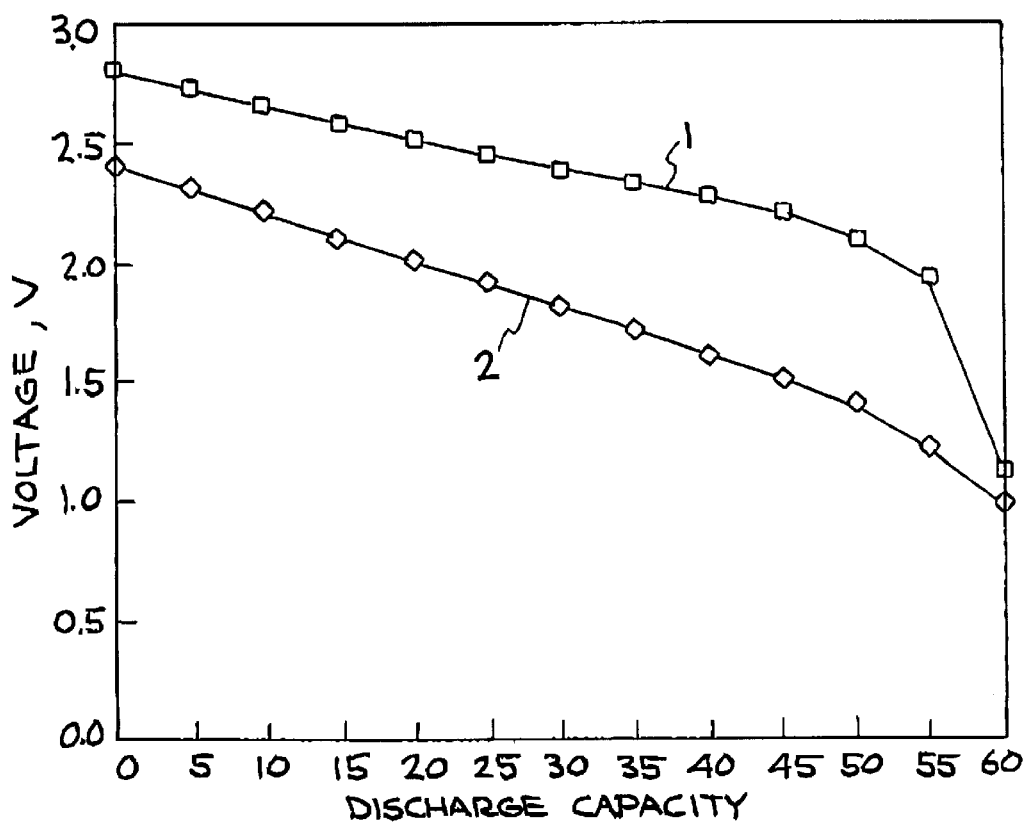

In FIG. 2 it is shown the discharge curve (1) of a solid state current source of the present invention, in which lanthanum is used as the anode; the compound fluoride, i.e. the solid solution $LaF_3$—$BaF_2$, is used as the electrolyte; and the compound fluoride with the ionic conductivity, i.e. the solid solution $BiF_3$—$KF$, is used as the cathode (the prototype). Besides, in FIG. 2 it is shown the discharge curve (2) of the current source of the present invention, in which the mixture of the compound fluoride $BiF_3$—$KF$ (90,5 m/o), and CuO (9,5 m/o) is used as the electrolyte. The discharge current reached 100 mA/cm². The temperature of the discharge is 500° C.

The design of the current source of the present invention may be schematically shown as three layers in a close contact over their surface area, i.e. <<1>> is a metal anode, <<2>> is a solid electrolyte with the fluoride ion conductivity, <<3>> is a solid cathode containing the mixture of a metal oxide and a compound fluoride with the ionic conductivity. The aforementioned fluoride compound includes at least two metals with a different valence.

The working principle of the solid state current source of the present invention is the following. In a closed external circuit, under the EDF effect, a fluoride ion from a compound fluoride of a cathode (3) is transported through the solid electrolyte with the fluoride ion conductivity to the anode/electrolyte area, where the ion reacts with the metal comprised in the anode, which results in the formation of a substance with the fluoride ion conductivity. The aforementioned reaction is characterized by the transport of the electrons along the external closed circuit. During the discharge, fluoride ions react with the anode material (at the anode), while in the cathode material the compound fluoride decomposes, which leads to the appearance of F⁻. Besides, a metal oxide, which was initially introduced in the cathode, reacts with the metals comprising a compound fluoride:

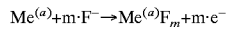

(the reaction at the cathode),

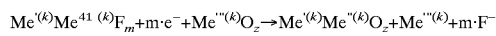

(the reaction at the cathode), where:
$Me^{(a)}$ is a metal of the anode;
$Me'Me''^{(k)}F_m$ is a metal oxide of the cathode material.

The use in the cathode of the current source of the present invention of the mixture comprising a compound fluoride with the ionic conductivity and a metal oxide leads to the increase of the isobaric (iso-thermal) potential of the current producing reaction, and to the rise of the EDF of the aforementioned current source.

The ionic conductivity of a compound fluoride of the cathode defines the stability of the discharge current, while along with that the increase of the discharge voltage is as well enhanced on account of the electronic conductivity rise in the cathode material due to the reduction of a metal oxide introduced in the cathode materials down to the metal. So, the use of the mixture of a compound fluoride with the ionic conductivity and a metal oxide as the cathode material leads to the enhancement of the specific power of a discharge current. During the discharge of the current source of the present invention at elevated temperatures, the metals with a low melting point, which are comprised in the cathode materials, are oxidized, and the oxides of these metals are formed, while the melting point of the aforementioned oxides is higher. This, in its turn, considerably widens the operational temperature range of the current source of the present invention.

The cause and effect relationship between the use in the cathode of the mixture, which consists of a metal oxide, and a compound fluoride on the one hand, and the enhancement of the current source parameters on the other hand is proven by the obtained experimental results. In the examples below the solid electrolyte is the compound fluoride, i.e. $LaF_3$—$BaF_2$ solid solution with the $BaF_2$ content of 6 mole percent. In the cathode, the following fluoride compounds are used: $BiF_3$—$KF$, or $Pb_xF_2$—$KF$ solid solutions with $KF$ content of 6 mole percent.

All the current sources mentioned in the examples below were produced using the technique of pressing the anode, electrolyte and cathode precursor powders layer-by-layer with the pressing pressure of 8000 kg/cm².

EXAMPLE 1

Prototype
the anode—La,
the electrolyte—$LaF_3$—$BaF_2$,
the cathode—$BiF_3$—$KF$ According to the experimental results, the OCV of the aforementioned source is 2.6–2.8 V (T=25–600° C.), while according to the thermodynamic calculations, the EDF of the source is 2.7–2.8 V (T=25–600° C.).

EXAMPLE 2

The solid state current source contains:

the anode —La, the electrolyte—$LaF_3$—$BaF_2$, the cathode—the mixture: $BiF_3$—KF (40 mole percent), CuO (60 mole percent).

According to the experimental results, the OCV of the aforementioned current source is 3.0–3.1V (T=200–500° C.), while according to the thermodynamic calculations the EDF of the source is 3.1V (T=200–500° C.).

EXAMPLE 3

The solid state current source contains:

the anode—La, the electrolyte—$LaF_3$—$BaF_2$, the cathode—the mixture: $BiF_3$—KF (90.5 mole percent), CuO (9.5 mole percent).

The aforementioned source was tested at 500° C. The discharge current density was 100 $mA/cm^2$. In FIG. 2 it is shown the discharge curve of the solid state current source of example 3, and that of the current source of example 1 (the prototype).

EXAMPLE 5–8

The solid state current source contains:

the anode—La, the electrolyte—$LaF_3$—$BaF_2$, the cathode—$BiF_3$—KF and CuO.

The current sources differed from one another in the mole percentage proportion of $BiF_3$—KF and CuO, which was: 11.5:88.5; 73:27; 86.4:13.6; 53.5:46.5; 96.9:3.1.

The obtained characteristics of the aforementioned current sources are the following: the OCV, and the power output (W) numbers of the sources of examples 1–8 in the temperature range 25–500° C. are shown in Table 1. The difference of the OCV numbers between the sources is explained by the use of different manufacturing techniques of the aforementioned sources.

TABLE 1

Open Circuit Voltage (OCV) and Power Output (W) of the Solid State Current Sources $La/LaF_3 - BF_2/(BiF_3 - KF) + CuO$.

| No | Cathode composition in the mole percentage | 25° C. OCV | 25° C. W | 100° C. OCV | 100° C. W | 200° C. OCV | 200° C. W |
|---|---|---|---|---|---|---|---|
| 1 | $BiF_3$ – KF (100%) prototype | 2.5–2.6 | $1.0 \cdot 10^{-5}$ | 2.73 | $2.0 \cdot 10^{-4}$ | 2.73 | $3.4 \cdot 10^{-3}$ |
| 2 | $BiF_3$ – KF-40 CuO-60 | 2.7 | $1.2 \cdot 10^{-3}$ | 2.82 | $4.5 \cdot 10^{-4}$ | 3.0–3.1 | $9 \cdot 10^{-3}$ |
| 3 | $BiF_3$ – KF-90.5 CuO-9.5 | 2.63 | $1.4 \cdot 10^{-5}$ | 2.8 | $2.5 \cdot 10^{-4}$ | 2.8 | $6.2 \cdot 10^{-3}$ |
| 4 | $BiF_3$ – KF-11.5 CuO-88.5 | 2.62 | $1.2 \cdot 10^{-5}$ | 2.8 | $2.6 \cdot 10^{-4}$ | 3.0–3.1 | $3.7 \cdot 10^{-3}$ |
| 5 | $BiF_3$ – KF-73 CuO-27 | 2.73 | $1.1 \cdot 10^{-5}$ | 2.75 | $2.4 \cdot 10^{-4}$ | 2.9–3.0 | $5.3 \cdot 10^{-3}$ |
| 6 | $BiF_3$ – KF-86.4 CuO-13.6 | 2.7–2.71 | $1.4 \cdot 10^{-5}$ | 2.75 | $2.4 \cdot 10^{-3}$ | 2.9 | $5.8 \cdot 10^{-3}$ |
| 7 | $BiF_3$ – KF-53.5 CuO-46.5 | 2.73 | $1.2 \cdot 10^{-5}$ | 2.8 | $2.8 \cdot 10^{-4}$ | 2.8 | $4.4 \cdot 10^{-3}$ |
| 8 | $BiF_3$ – KF-96.9 CuO-3.1 | 2.7 | $1.4 \cdot 10^{-5}$ | 2.8 | $2.6 \cdot 10^{-4}$ | 2.8 | $7.5 \cdot 10^{-3}$ |

| No | Cathode composition in the mole percentage | 300° C. OCV | 300° C. W | 400° C. OCV | 400° C. W | 500° C. OCV | 500° C. W |
|---|---|---|---|---|---|---|---|
| 1 | $BiF_3$ – KF (100%) prototype | 2.74 | $2.3 \cdot 10^{-2}$ | 2.7 | $1.4 \cdot 10^{-1}$ | 2.74 | $4.8 \cdot 10^{-1}$ |
| 2 | $BiF_3$ – KF-40 CuO-60 | 3.1–3.2 | $3.8 \cdot 10^{-2}$ | 3.0–3.1 | $1.5 \cdot 10^{-1}$ | 3.0–3.2 | $5.3 \cdot 10^{-1}$ |
| 3 | $BiF_3$ – KF-90.5 CuO-9.5 | 2.84 | $3.1 \cdot 10^{-2}$ | 2.9 | $2.3 \cdot 10^{-1}$ | 2.8–2.9 | $5.3 \cdot 10^{-1}$ |
| 4 | $BiF_3$ – KF-11.5 CuO-88.5 | 3.0–3.1 | $2.9 \cdot 10^{-2}$ | 3.1–3.2 | $1.5 \cdot 10^{-1}$ | 3.1–3.2 | $7.4 \cdot 10^{-1}$ |
| 5 | $BiF_3$ – KF-73 CuO-27 | 2.95 | $3.2 \cdot 10^{-2}$ | 3.1 | $1.6 \cdot 10^{-1}$ | 3.0–3.1 | $7.5 \cdot 10^{-1}$ |
| 6 | $BiF_3$ – KF-86.4 CuO-13.6 | 2.97 | $3.5 \cdot 10^{-2}$ | 3.0 | $2.2 \cdot 10^{-1}$ | 3.0 | $8.4 \cdot 10^{-1}$ |
| 7 | $BiF_3$ – KF-53.5 CuO-46.5 | 2.9–3.1 | $2.6 \cdot 10^{-2}$ | 3.0–3.1 | $1.5 \cdot 10^{-1}$ | 3.1–3.2 | $7.7 \cdot 10^{-1}$ |
| 8 | $BiF_3$ – KF-96.9 CuO-3.1 | 2.87 | $3.3 \cdot 10^{-2}$ | 3.0 | $2.6 \cdot 10^{-1}$ | 2.8 | $8.2 \cdot 10^{-1}$ |

EXAMPLES 9–11

A solid state current source contains:
the anode—La,
the electrolyte—$LaF_3$—$BaF_2$,
the cathode—$BiF_3$—KF и $PbO_2$.

The current sources differed from one another in the mole percentage proportion of $BiF_3$—KF and $PbO_2$, which was: 78.6:21.4; 86.9:13.1; 94.8:5.2.

EXAMPLE 12

A solid state current source contains:
the anode—La,
the electrolyte—$LaF_3$—$BaF_2$,
the cathode—$BiF_3$—KF (43.3 mole percent) $MnO_2$ (56.7 mole percent)

EXAMPLE 13

A solid state current source contains:
the anode—La,
the electrolyte—$LaF_3$—$BaF_2$,
the cathode—$BiF_3$—KF (56.6 mole percent) $Ag_2O$ (43.4 mole percent).

EXAMPLE 14

A solid state current source contains:
the anode—La,
the electrolyte—$LaF_3$—$BaF_2$,
the cathode—$BiF_3$—KF (67 mole percent) $V_2O_5$ (33 mole percent)

EXAMPLES 15

A solid state current source contains:
the anode—La,
the electrolyte—$LaF_3$—$BaF_2$,
the cathode—$PbF_2$—KF (56.4 mole percent) and CuO (43.6 mole percent).

The obtained parameters of the aforementioned current sources are the following: the OCV, and the output power (W) of the sources of examples 9–15 over the temperature range of 25–500° C. are shown in Table 2.

TABLE 2

Open Circuit Voltage (OCV) and Power Output (W) of Solid State Current Sources with the Lanthanum Anode, Solid Electrolyte $LaF_3$ – $BaF_2$, and with Different Cathodes.

| No | Cathode composition in the mole percentage | 25° C. OCV | 25° C. W | 100° C. OCV | 100° C. W | 200° C. OCV | 200° C. W |
|---|---|---|---|---|---|---|---|
| 9 | $BiF_3$ – KF-78.6 $PubO_2$-21.4 | 3.6–3.7 | $2.1 \cdot 10^{-3}$ | 3.7–3.8 | $2.8 \cdot 10^{-4}$ | 3.7 | $6 \cdot 10^{-3}$ |
| 10 | $BiF_3$ – KF-86.9 $PbO_2$-13.1 | 3.8 | $1.7 \cdot 10^{-5}$ | 3.8–3.85 | $2.4 \cdot 10^{-4}$ | 3.8–3.9 | $9.5 \cdot 10^{-3}$ |
| 11 | $BiF_3$ – KF-94.8 $PbO_2$-5.2 | 3.7–3.8 | $1.9 \cdot 10^{-5}$ | 3.7–3.8 | $2.9 \cdot 10^{-4}$ | 3.9 | $4.9 \cdot 10^{-3}$ |
| 12 | $BiF_3$ – KF-43.3 $MnO_2$-56.7 | 3.3–3.4 | $1.9 \cdot 10^{-5}$ | 3.4 | $2.2 \cdot 10^{-4}$ | 3.3–3.4 | $3.6 \cdot 10^{-3}$ |
| 13 | $BiF_3$ – KF-56.6 $Ag_2O$-43.4 | 3.3–3.5 | $2.0 \cdot 10^{-5}$ | 3.5–3.6 | $3.4 \cdot 10^{-4}$ | 3.5 | $5.3 \cdot 10^{-3}$ |
| 14 | $BiF_3$ – KF-67 $V_2O_5$-33 | 2.8–3.0 | $1.7 \cdot 10^{-5}$ | 2.8–3.1 | $2.5 \cdot 10^{-4}$ | 3.3 | $4.1 \cdot 10^{-3}$ |
| 15 | $PbF_2$ – KF-56.4 CuO-43.6 | 2.62 | $1.3 \cdot 10^{-5}$ | 2.8 | $2.4 \cdot 10^{-4}$ | 2.8 | $3.7 \cdot 10^{-3}$ |

| No | Cathode composition in the mole percentage | 300° C. OCV | 300° C. W | 400° C. OCV | 400° C. W | 500° C. OCV | 500° C. W |
|---|---|---|---|---|---|---|---|
| 9 | $BiF_3$ – KF-78.6 $PubO_2$-21.4 | 3.7–3.8 | $2.9 \cdot 10^{-2}$ | 3.1–3.2 | $3.3 \cdot 10^{-1}$ | 2.8–2.9 | $8.1 \cdot 10^{-1}$ |
| 10 | $BiF_3$ – KF-86.9 $PbO_2$-13.1 | 3.8–3.9 | $3.8 \cdot 10^{-2}$ | 2.9–3.0 | $2.4 \cdot 10^{-1}$ | 2.7–2.8 | $7.7 \cdot 10^{-1}$ |
| 11 | $BiF_3$ – KF-94.8 $PbO_2$-5.2 | 3.0–3.1 | $2.6 \cdot 10^{-2}$ | 2.9–3.0 | $1.5 \cdot 10^{-1}$ | 2.6–2.7 | $6.5 \cdot 10^{-1}$ |
| 12 | $BiF_3$ – KF-43.3 $MnO_2$-56.7 | 3.2–3.3 | $3.2 \cdot 10^{-2}$ | 3.5–3.6 | $2.1 \cdot 10^{-1}$ | 2.9–3.1 | $3.8 \cdot 10^{-1}$ |
| 13 | $BiF_3$ – KF-56.6 $Ag_2O$-43.4 | 3.5 | $3.9 \cdot 10^{-2}$ | 3.5 | $2.3 \cdot 10^{-1}$ | 3.1–3.2 | $9.6 \cdot 10^{-1}$ |
| 14 | $BiF_3$ – KF-67 $V_2O_5$-33 | 3.1–3.2 | $2.9 \cdot 10^{-2}$ | 3.2–3.3 | $2.8 \cdot 10^{-1}$ | 3.2 | $6.6 \cdot 10^{-1}$ |
| 15 | $PbF_2$ – KF-56.4 CuO-43.6 | 2.9 | $2.5 \cdot 10^{-2}$ | 2.8 | $1.5 \cdot 10^{-1}$ | 2.8–2.9 | $7.3 \cdot 10^{-1}$ |

From the aforementioned examples it is obvious that the current source of the present invention has high technical performance, which is better than that of the source prototype. The current source of the present invention is distinguished for a high magnitude of the OCV. The superseding of the source's OCV over as compared to the source prototype is observed temperature range, and varies in the range of 1–40%. Along with the aforementioned variations of the OCV, a specific power of the discharge current is increased. In several cases, the specific power of the discharge current was increased by factor of 2 (examples 9,10).

The important advantage of the current source of the present invention is that the source shows a more reliable operation as compared to the source prototype in the high temperature range, i.e. T>271° C. because the cathode reduction products have a higher melting point, which provides the stability of the solid phase of the cathode during the discharge.

Among the oxides, which can be introduced into a cathode, it is worth mentioning $PbO_2$, $MnO_2$ and $Ag_2O$, the use of which allows to considerably increase the OCV of the current sources. Nevertheless, it is worth stressing the advantage of the CuO, $V_2O_5$ and $Ag_2O$ use in the cathodes because these oxides provide a stable and high enough OCV up to 500° C. This is very important because it allows not only to expand the temperature range of the source operation, but also to widen the manufacturing technology capabilities of a high temperature treatment of the current sources, in order to reduce their internal electric resistance.

What is claimed is:

1. A cathode for a solid state electrochemical current source comprising:

a compound fluoride containing at least two metals of different valences;

and a metal oxide.

2. The cathode as recited in claim 1 wherein:

the range of mole ratios, in mole %, for said compound fluoride and metal oxide are the following:

compound fluoride: 11.5–96.9;

metal oxide: 3.1–88.5.

3. The cathode as recited in claim 1 wherein:

said metal oxide is selected from the group consisting of copper oxide CuO, lead oxide $PbO_2$, manganese oxide $MnO_2$, vanadium oxide $V_2O_5$, and silver oxide $Ag_2O$.

4. The cathode as recited in claim 1 wherein:

said compound fluoride is selected from the group of solid solutions consisting of bismuth fluoride $BiF_3$ and potassium fluoride KF; and lead fluoride $PbF_2$ and potassium fluoride KF.

5. A solid state electrochemical current source comprising:

a solid state anode;

a solid state fluoride ion conducting electrolyte; and a solid state cathode comprising a metal oxide and a compound fluoride containing at least two metals of different valences.

6. The current source as recited in claim 5 wherein:

said electrolyte includes at least one fluoride of a rare earth metal and at least one fluoride of an alkaline earth metal.

7. The current source as recited in claim 5 wherein:

said anode material is selected from the group consisting of rare earth metals and rare earth metal alloys.

8. The current source as recited in claim 5 wherein:

the range of mole ratios, in mole %, for said compound fluoride and met oxide are the following:

compound fluoride: 11.5–96.9;

metal oxide: 3.1–88.5.

9. The current source as recited in claim 5 wherein:

said metal oxide is selected from the group consisting of copper ode CuO, lead oxide PbO2, manganese oxide $MnO_2$, vanadium oxide $V_2O_5$, and silver oxide $Ag_2O$.

10. The current source as recited in claim 5 wherein:

said compound fluoride is selected from the group of solid solutions consisting of bismuth fluoride BiF3 and potassium fluoride KF; and lead fluoride $PbF_2$ and potassium fluoride KF.

* * * * *